(12) United States Patent
Holl et al.

(10) Patent No.: US 7,462,944 B2
(45) Date of Patent: Dec. 9, 2008

(54) HYBRID DRIVE SYSTEM AND METHOD FOR CONTROLLING A HYBRID DRIVE SYSTEM

(75) Inventors: Eugen Holl, Langenzenn (DE); Swen Ruppert, Möhrendorf (DE)

(73) Assignee: Siemens Aktiengesellschaft, München (DE)

( * ) Notice: Subject to any disclaimer, the term of this patent is extended or adjusted under 35 U.S.C. 154(b) by 565 days.

(21) Appl. No.: 10/549,084

(22) PCT Filed: Mar. 5, 2004

(86) PCT No.: PCT/EP2004/002293

§ 371 (c)(1),
(2), (4) Date: Oct. 13, 2005

(87) PCT Pub. No.: WO2004/080747

PCT Pub. Date: Sep. 23, 2004

(65) Prior Publication Data

US 2008/0066977 A1 Mar. 20, 2008

(30) Foreign Application Priority Data

Mar. 11, 2003 (DE) ................................ 103 10 574

(51) Int. Cl.
*B60L 11/12* (2006.01)
(52) U.S. Cl. ...................................... 290/1 R
(58) Field of Classification Search ................... 290/1 R
See application file for complete search history.

(56) References Cited

U.S. PATENT DOCUMENTS

| 4,335,429 | A | * | 6/1982 | Kawakatsu | .................. | 701/102 |
| 5,713,426 | A | * | 2/1998 | Okamura | .................... | 180/65.3 |
| 5,848,659 | A | * | 12/1998 | Karg et al. | .................. | 180/65.4 |
| 6,486,632 | B2 | * | 11/2002 | Okushima et al. | ............ | 318/599 |
| 6,591,758 | B2 | * | 7/2003 | Kumar | ......................... | 105/35 |
| 6,670,788 | B2 | * | 12/2003 | Prabhu et al. | ................ | 320/104 |
| 6,794,846 | B2 | * | 9/2004 | Tsuji | ............................ | 320/103 |
| 2002/0027789 | A1 | * | 3/2002 | Okushima et al. | ............. | 363/41 |
| 2003/0081440 | A1 | * | 5/2003 | Komatsu et al. | ............. | 363/132 |
| 2003/0089557 | A1 | | 5/2003 | Eilinger | | |
| 2003/0090235 | A1 | * | 5/2003 | Tsuji | ........................... | 320/128 |

(Continued)

FOREIGN PATENT DOCUMENTS

DE 196 24 090 C 10/1997

(Continued)

*Primary Examiner*—Joseph Waks
(74) *Attorney, Agent, or Firm*—Henry M. Feiereisen

(57) ABSTRACT

A hybrid driving system for a vehicle including a generator connected to an internal combustion engine (1) which is linked to an electric driving motor (6) by means of a generator frequency converter, an intermediate voltage circuit and a motor frequency converter. An energy-storage reservoir (7) is connected to the intermediate voltage circuit. The intermediate voltage circuit is divisible into two partial intermediate circuits (3, 4) by means of a first switch (8). Each partial intermediate circuit includes at least one driving motor (5, 6, 12) connected by means of the corresponding motor frequency converter. For the purpose of adjusting the hybrid driving system, when the voltage (U3) in the energy storage reservoir (7) is lower than the voltage of the corresponding intermediate voltage circuit, the first switch (8) arranged between two intermediate circuits (3, 4) switches off the link and the first switch (8) becomes an open conductor only.

9 Claims, 1 Drawing Sheet

U.S. PATENT DOCUMENTS

2005/0000741 A1 * 1/2005 Holl et al. .................. 180/65.3

FOREIGN PATENT DOCUMENTS

| DE | 196 30 284 A1 | 1/1998 |
| DE | 101 37 908 A | 2/2003 |
| DE | 10137908 A1 * | 2/2003 |
| EP | 0 543 203 A | 5/1993 |
| EP | 543203 A1 * | 5/1993 |
| EP | 1 186 497 A | 3/2002 |
| EP | 1186497 A1 * | 3/2002 |
| JP | 2001 145208 | 5/2001 |
| JP | 2001145208 A * | 5/2001 |
| WO | WO 01/74699 A | 10/2001 |

* cited by examiner

HYBRID DRIVE SYSTEM AND METHOD FOR CONTROLLING A HYBRID DRIVE SYSTEM

BACKGROUND OF THE INVENTION

The invention relates to a hybrid drive system for a vehicle having a generator, which is coupled to an internal combustion engine and is connected to an electric drive motor via a generator converter, a voltage intermediate circuit and a motor converter, with an energy store being connected to the voltage intermediate circuit.

The invention also relates to a method for controlling a hybrid drive system such as this.

A system such as this, as well as a method such as this, are known from DE 101 37 908 A1.

A hybrid drive system is used both for road vehicles and for rail vehicles. A battery or a high-power capacitor may be used as the energy store.

Because its energy density is relatively low, the no-load voltage of a capacitor falls relatively quickly as it is discharged. In the case of a battery, the no-load voltage depends on various factors, such as the state of discharge, the previous history and the temperature. In the case of a capacitor or in the case of a battery, the terminal voltage of the energy store is also governed, in addition to the no-load voltage, by the load-dependent voltage drop across its own internal resistance. This then leads to a low intermediate-circuit voltage, which has a negative effect on the operation of the drive motor and of the generator.

It is already known for this disadvantage of the low voltage to be counteracted by producing a high current flow, although this requires heavy, oversize components. It is also already known for an energy store to be connected to the intermediate circuit via a step-up/step-down controller. However, this requires complex, expensive electronics. Finally, it is known from German Patent Application 101 37 908 that the energy store can be connected to the intermediate circuit via a switch. When it is not required, the energy store can then be disconnected from the rest of the system, so that the low voltage on the energy store cannot disadvantageously affect the drive.

In this case, however, it is accepted that no more power can be drawn from the store once the energy store has been disconnected. Particularly if the store is a high-power capacitor, its capacitance then cannot be completely used. In the end this leads to the internal combustion engine and the generator having to be made larger.

SUMMARY OF THE INVENTION

The invention is based on the object of specifying a hybrid drive system and a method for controlling the hybrid drive system which require neither overdesign of components nor additional electronic components, and which nevertheless can completely use the energy stored in the energy store.

The object of specifying a suitable hybrid drive system is achieved according to the invention in that the voltage intermediate circuit can be divided by a first switch into two intermediate circuit elements, and in that at least one drive motor is connected via an associated motor converter to each of the two intermediate circuit elements.

Operation of the converter requires a minimum intermediate-circuit voltage, which is dependent on the rotation speed and on the current of the drive motors or of the generator.

Separation of the voltage intermediate circuit into intermediate circuit elements achieves the advantage that the two intermediate circuit elements can be operated at a different voltage level. When the first switch between the two intermediate circuit elements disconnects them from one another, this is because the energy store is connected to only one of the two intermediate circuit elements and the drive motors which are connected to the other intermediate circuit element can operate independently of the voltage on the energy store. Only those drive motors, which are connected to that intermediate circuit element which is connected to the energy store, operate at reduced power. However, this has no disturbing effect since the other drive motors can compensate for this power reduction.

When it is possible to operate from a common, undivided intermediate circuit as is the situation when the voltage at the energy store is above the minimum intermediate-circuit voltage, for example during braking, it is sensible to connect the two intermediate circuit elements to one another via the first switch. To do this, the voltages in the two intermediate circuit elements must first of all be matched to one another by means of skillful voltage regulation.

This results in the advantage that a low voltage on the energy store cannot have any disadvantageous effect on the drive system.

The first switch is, for example, a semiconductor switch and contains, for example, a reverse-biased diode. It may be integrated in the converter. This results in a cost advantage.

By way of example, the energy store is connected to the voltage intermediate circuit directly or via a second switch.

The object of specifying a suitable method for controlling the hybrid drive system is achieved according to the invention in that, when the voltage on the energy store is lower than the at least required intermediate-circuit voltage, the first switch between the two intermediate circuit elements interrupts the connection, and in that the first switch is otherwise switched on.

This results in the advantage that a voltage which is low at times on the energy store can affect only one of the two drive motor systems. In comparison to fixed coupling between the two intermediate circuit elements, this results in the advantage of higher power from the overall system. Fundamentally, the times at which the first switch is closed and open depend on the design of the overall system and the use of the components in the overall system. The time from which the intermediate circuit elements are disconnected by the first switch is governed by the voltage on the energy store.

When the voltage on the energy store falls such that the drive motors or the generator can no longer produce their rated power owing to the reduced voltage, the two intermediate circuit elements are disconnected.

The following method is used to carry out the disconnection process: all of the instantaneous power from the diesel generator set is fed into the drive motors which are associated with the same intermediate circuit element. The power of the drive motors in the other intermediate circuit element is selected such that there is no change in the power for the overall system. This means that virtually no current flows via the first switch.

This results in the advantage that the switching is carried out without any influence on the operating point of the diesel engine and on the generator which is connected to it, while maintaining the system power of the overall system.

When the two intermediate circuit elements have been disconnected, the voltage level in the intermediate circuit element which is connected to the generator converter is raised to such an extent that this subsystem operates at the optimum operating point. The required increase in power is now produced by increasing the power in this subsystem in order to raise the overall traction power to the maximum. This can be done using different algorithms, depending on the system configuration.

When the voltage on the energy store increases again, so that the overall system could be operated on a common intermediate circuit at this voltage, the two intermediate circuit elements are interconnected again via the first switch. Before the first switch between the two intermediate circuit elements is switched on again, the voltages in the two intermediate circuit elements are matched in order to prevent the flow of an excessively large balancing current.

By way of example, before the first switch disconnects the connection, the power levels of the drive motors are controlled such that there is virtually no current flowing through the switch.

Before the first switch is switched on, the voltages in the two intermediate circuit elements, for example, are matched.

In order to match the voltages, the voltage in the first intermediate circuit element, which is connected to the generator converter, is regulated down by means of a voltage regulator, for example.

According to another example, the voltages are matched by increasing the voltage in the second intermediate circuit element, which is connected to the energy store, by reducing the load on at least one drive motor, whose associated motor converter is connected to this second intermediate circuit element.

By way of example, the voltage in the second intermediate circuit element, which is connected to the energy store, is increased by slightly braking at least one drive motor whose associated motor converter is connected to this second intermediate circuit element, as a result of which electrical power is produced in the generator mode.

This method is used in particular, when, as described in DE 101 37 908 A1, the energy store is intended to be disconnected from the intermediate circuit via the second switch and the drive motors are intended to draw their power purely from the internal combustion engine (diesel-electric mode). If the two intermediate circuit elements have been disconnected from one another in advance in this situation, and if it is then additionally intended to disconnect the energy store, the two intermediate circuit elements must be immediately reconnected after disconnection of the energy store. In order to match the voltages in the intermediate circuit elements to one another, prior to this, the voltage U2 in the intermediate circuit element which is associated with the energy store (second intermediate circuit element) is matched to the voltage U1 in the intermediate circuit element which is connected to the generator converter (first intermediate circuit element). When the switches are open, this can be done only by the drive motors drawing braking energy in the second intermediate circuit element. This is advantageously done by using a higher-level voltage regulator to apply a small braking torque, which has no disturbing effect on the driving response, to the traction motors in the second intermediate circuit element with the voltage U2 being regulated at the same value as the voltage U1. When the two voltages are approximately the same, the first switch can be closed.

BRIEF DESCRIPTION OF THE DRAWING

One exemplary embodiment of a hybrid drive system and of a method for controlling a hybrid drive system such as this, according to the invention, will be explained in more detail with reference to the drawing.

DETAILED DESCRIPTION OF PREFERRED EMBODIMENTS

Figure 1:
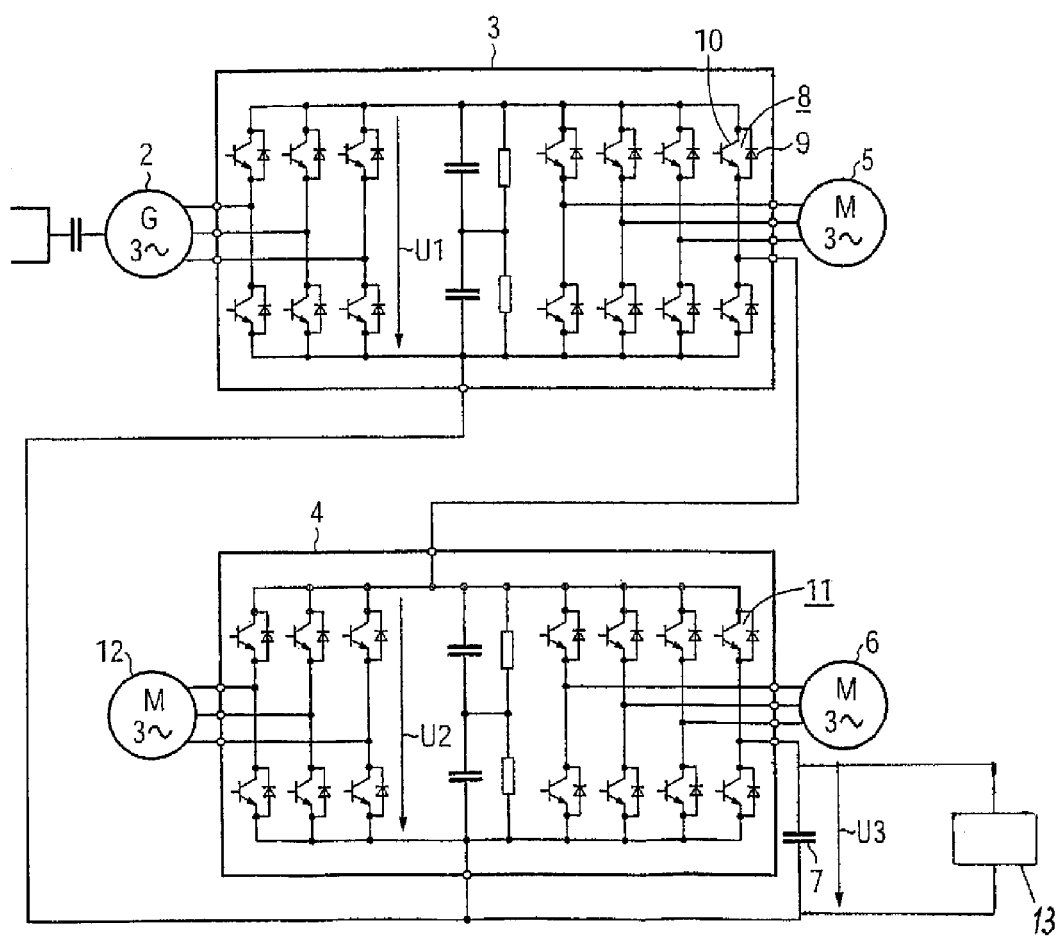
FIG. 1 shows a hybrid drive system with two intermediate circuit elements and two drive motors.

The hybrid drive system shown in the drawing comprises an internal combustion engine 1, in particular a diesel engine, a generator 2, two intermediate circuit elements 3 and 4, two drive motors 5 and 6 and an energy store 7, which is a capacitor in the illustrated example. The first intermediate circuit element 3 is connected to the second intermediate circuit element 4 via a first switch 8. The first switch 8 consists of a diode 9, forward-biased towards the first intermediate circuit element 3, and a transistor 10 which is forward-biased towards the second intermediate circuit element 4 and is arranged in parallel with the diode 9 and can be switched on and off. A voltage regulator, which is not shown, is provided in order to regulate the voltage U1 in the first intermediate circuit element 3. A voltage regulator, which is not shown, is also provided in order to regulate the voltage U2 in the second intermediate circuit element 4.

The second intermediate circuit element 4 and the drive motor 6 which is connected to it are influenced by the voltage on the energy store 7. A second switch 11 is located between the energy store 7 and the second intermediate circuit element 4. When this second switch 11 is closed, the first intermediate circuit element 3 and the additional drive motor 5 which is connected to it can be disconnected from the energy store voltage U3, which is applied to the second intermediate circuit element 4, by opening the first switch 8.

While the energy store 7 is discharging, a current can flow via the diode 9 to the first intermediate circuit element 3, and thus to the additional drive motor 5. In order to ensure that a voltage on the energy store 7 which is lower than the minimum intermediate-circuit voltage has no negative effect, the transistor 10 is opened and the voltage level in the first intermediate circuit element 3 is increased by means of a voltage regulator 13. The diode 9 is then reverse-biased, so that the first intermediate circuit element 3 is electrically disconnected from the second intermediate circuit element 4. The two intermediate circuit elements 3 and 4 can then be operated at different voltage levels so that the voltage U3 on the energy store 7 can affect only the second intermediate circuit element 4, and not the first intermediate circuit element 3. Any possible power loss in the drive motor 6 is then compensated for by additional power from the additional drive motor 5.

When the vehicle is intended to be braked and the kinetic energy is intended to be converted to electrical energy by the drive motors 5 and 6 being operated in the generator mode, the voltage U1 in the first intermediate circuit element 3 is briefly reduced to the voltage U2 in the second intermediate circuit element 4, and the transistor 10 in the first switch 8 is switched on. Electrical energy originating from the additional drive motor 5 can then also be stored in the energy store 7.

Since the energy store 7 is disconnected only from the first intermediate circuit element 3 and not from the second intermediate circuit element 4, the remaining charge in the energy store 7 is advantageously not left in the energy store 7 while driving. In consequence, the vehicle operation is more energy-efficient than when used in a previously-known hybrid drive system.

Just by way of example, the energy store 7 can additionally be disconnected from the second intermediate circuit element 4 via the second switch 11, whose function corresponds to that of the first switch 8. The second switch 11 is opened when all of the loads are being fed exclusively via the internal combustion engine 1 (diesel-electric mode).

By way of example, an auxiliary drive motor 12, which assists the drive motor 6, can be associated with the second intermediate circuit element 4.

The hybrid drive system and the control method achieve the advantage that, while driving, the remaining energy stored in the energy store 7 can be used completely and that, nevertheless, the power of the drive, in particular of the additional drive motor 5, is not adversely affected by the low voltage on the energy store 7. The lack of power from the drive motor 6 is compensated for while driving by additional power from the additional drive motor 5.

What is claimed is:

1. A hybrid drive system for a vehicle, comprising:
    an internal combustion engine;
    a generator coupled to the internal combustion engine;
    a plurality of electric drive motors connected to the generator via a generator converter, a voltage intermediate circuit and a motor converter;
    an energy store connected to the voltage intermediate circuit;
    a first switch dividing the voltage intermediate circuit into two intermediate circuit elements, wherein at least one drive motor is connected via its associated motor converter to one of the two intermediate circuit elements, and at least one other drive motor is connected via its associated motor converter to the other of the two intermediate circuit elements.

2. The hybrid drive system as claimed in claim 1, further comprising a second switch connecting the energy store to the voltage intermediate circuit.

3. The hybrid drive system of claim 1, further comprising a voltage regulator which measures a voltage on the energy store and causes the first switch to interrupt a connection between the two intermediate circuit elements if the voltage on the energy store is lower than a smallest required intermediate-circuit voltage, and causes the first switch to be conducting and maintaining the connection if the voltage on the energy store is greater than the smallest required intermediate-circuit voltage.

4. In a hybrid drive system for a vehicle with a generator coupled to an internal combustion engine, with a plurality of electric drive motors connected to the generator via a generator converter, with a voltage intermediate circuit and a motor converter, with an energy store connected to the voltage intermediate circuit, with a first switch dividing the voltage intermediate circuit into two intermediate circuit elements, wherein at least one drive motor is connected via its associated motor converter to one of the two intermediate circuit elements, and at least one other drive motor is connected via its associated motor converter to the other of the two intermediate circuit elements, a method for controlling the hybrid drive system, comprising the step of interrupting with the first switch a connection between the two intermediate circuit elements when a voltage on the energy store is lower than a smallest required intermediate-circuit voltage, and maintaining the first switch in a conductive state if the voltage on the energy store is equal or greater than the smallest required intermediate-circuit voltage.

5. The method as claimed in claim 4, further comprising the step of controlling a power level of the drive motors such that there is virtually no current flowing through the first switch before the first switch interrupts the connection.

6. The method as claimed in claim 4, further comprising the step of matching intermediate circuit voltages in the two intermediate circuit elements, before switching the first switch into a conductive state.

7. The method as claimed in claim 6, wherein matching the intermediate circuit voltages comprises regulating the intermediate circuit voltage in the first intermediate circuit element, which is connected to the generator converter, down by a voltage regulator.

8. The method as claimed in claim 6, wherein matching the intermediate circuit voltages comprises increasing the intermediate circuit voltage in the second intermediate circuit element, which is connected to the energy store, by reducing a load on at least one drive motor which is powered by a motor converter connected to this second intermediate circuit element.

9. The method as claimed in claim 8, wherein increasing the voltage in the second intermediate circuit element connected to the energy store comprises slightly braking the at least one drive motor which is powered by the motor converter connected to this intermediate circuit element, thereby producing electric power in generator mode.

* * * * *